CRYSTAL MIXING DEVICE WITH WIDE FREQUENCY BAND

Filed Jan. 8, 1952

INVENTOR
JACQUES FAGOT
By:
Haseltine, Lake & Co.
AGENTS 2,755,376

CRYSTAL MIXING DEVICE WITH WIDE FREQUENCY BAND

Jacques Fagot, Paris, France, assignor to Compagnie Generale de Telegraphie Sans Fil, a corporation of France Application January 8, 1952, Serial No. 265,479

Claims priority, application France January 12, 1951

3 Claims. (Cl. 250—20)

The present invention relates to a crystal mixing device having wide band characteristics, and more particularly to a mixing device of this nature wherein the parasite capacities of two mixing crystals are combined with a selected inductance to constitute a circuit having a desired frequency of resonance.

It is known that the use of detecting silicium or germanium crystals as mixers and frequency changers involves some difficulties in matching these crystals to the selective resonant circuits which are generally used in the high frequency mixers of receivers. These difficulties are due to the fact that, in a frequency band which can be situated between 500 and 1000 megacycles, these crystals have a capacitive impedance which make them tune at determined frequencies with the self-inductances unavoidably present in the connections.

The present invention has for its object to remedy this drawback. According to the invention, in a mixing device, two crystals are used, which, in parallel, feed the same intermediate frequency circuit, but which are separately inserted in the high frequency resonant circuit at suitable points, and with series self inductances having various values. This makes it possible to displace the resonance frequency of the first crystal with its corresponding self-inductance in relation to the resonance frequency of the second crystal with its associated self-inductance. By a suitable choice of these two resonance frequencies and of the separate branching points of the two crystals in the circuit, it is possible, in the band to be covered, to be always near enough to one of these frequencies for the band width, and therefore the damping of the mixing circuit, to be great and keep a nearly constant value. In the whole of that band, therefore, the high frequency energy will thus be utilised with a good efficiency for rectifying. Moreover, the total rectified energy will be the sum of the energies rectified by each of the two crystals, and if one of them is near its resonance frequency, it will present a small impedance to the high frequency currents and practically will short circuit the second crystal which, being far from its resonance, will present a high impedance to these currents, and therefore would operate in these conditions with a bad efficiency; moreover, in strongly damping the oscillating circuit, the latter crystal would decrease the band width of that circuit.

Figure 1:
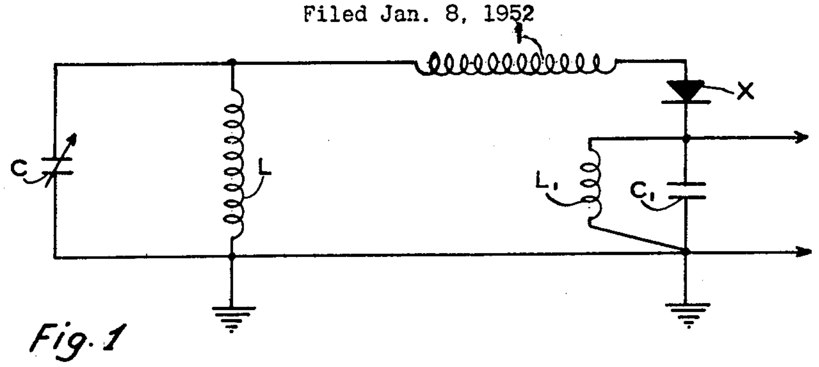

The invention will be better understood by means of the accompanying drawings wherein:

Figure 1 shows the known diagram of a crystal detecting circuit in which the crystal is inserted in the whole of the oscillating circuit of the conventional type with self-inductance-capacity by means of a self-inductance.

Figure 2:
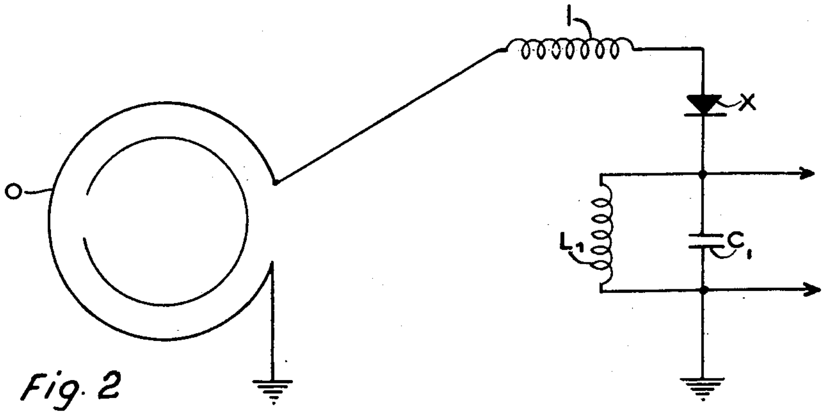

Figure 2 relates to a similar diagram where the conventional oscillating circuit is replaced by an oscillating circuit of the "cylinder" type.

Figure 3:
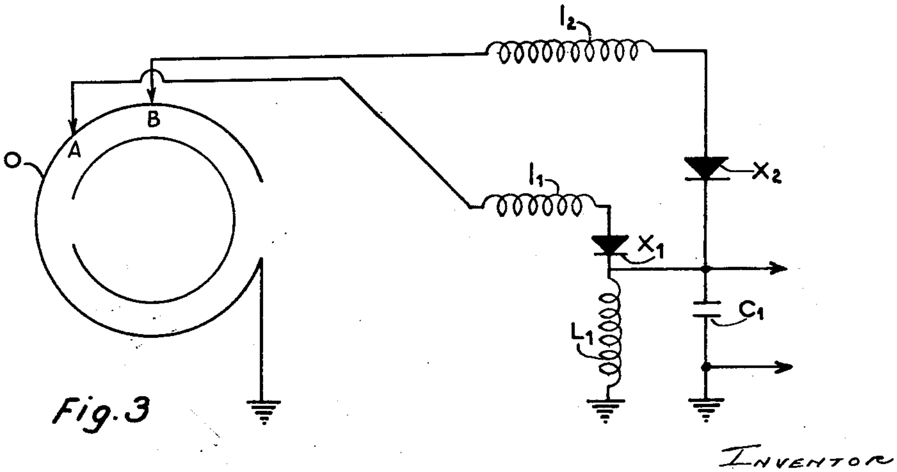

Figure 3 shows the diagram of the detecting circuit according to the invention, associated with an oscillating circuit of the "cylinder" type.

In Figure 1, C and L are the capacity and the inductance respectively of the oscillating circuit. The crystal X is inserted in the whole of this oscillating circuit by means of an inductance 1. This inductance represents either the unavoidable inductance of the connection, or an inductance which has deliberately been inserted in series in order to obtain a certain law of band width in relation with frequency. The crystal feeds the intermediate frequency circuit by means of an inductance $L_1$ and a capacitor $C_1$ connected in parallel on the latter circuit.

By a simple calculation, it is easy to see that, if the crystal X were to behave as a pure resistance, the combination crystal-oscillating circuit would have a constant band width about its proper frequency, in the case where, leaving L fixed, C were made to vary. It is known that the band width $\Delta F$ of an oscillating circuit is the frequency band included between the two frequencies for which the resistance of the circuit is equal to its reactance.

In Figure 2, the circuit composed of lumped constants of the Figure 1 is replaced by a circuit composed of distributed inductances and capacities of the "cylinder" type. The circuit is formed by two coaxial metallic cylinders, each one slit along a generating line. As regards these circuits, it is known that their capacity can be made to vary, their inductance remaining constant, by relatively rotating one of the cylinders about their common axis. The equivalent diagram of these circuits is an oscillating circuit similar to that of Figure 1, whose inductance L is fixed, while its capacity is variable. For such a circuit it is therefore evident that, assuming the crystal X can be assimilated to a pure resistance, the band width $\Delta F$ would be constant when one of the cylinders is rotated about its axis.

If, however, as it happens really, the impedance of the crystal X includes a nonnegligible capacitance, the circuit band width is not more constant. Indeed, the inductance L and the capacitance of the crystal may for some frequencies be tuned. For these frequencies, the equivalent resistance of the combination crystal-inductance 1 turns out to be very small whereby an important damping of the principal circuit is produced, and the band width $\Delta F$ is then considerably increased. It should be noted that, for crystals of usual type, these resonance frequencies are situated in the band 450–950 megacycles, particularly in the case where the inductance is only composed of the unavoidable inductance of the connections.

According to the invention, two crystals $X_1$, $X_2$ are provided in Figure 3, for mixing a first signal on which the cylinder oscillating circuit O is tuned and a second signal fed to the cylinder, for instance by means of a loop $S_2$. The first signal may be fed to the circuit from an antenna in known manner (see E. Karplus "Wide Range Tuned Circuits and Oscillators for High Frequencies," Proceedings Institute of Radio Engineers July, 1945), whereas the second signal may be fed either by a Tesla loop or by direct connection. These two crystals feed the same intermediate frequency circuit in parallel. They are inserted on the cylinder oscillating circuit O at suitable points A and B, through inductances $\mathbf{1}_1$ and $\mathbf{1}_2$ of different values, so as to displace the respective tuning of $\mathbf{1}_1$ and $\mathbf{1}_2$ with the capacities of the two crystals $X_1$ and $X_2$. In this manner, if one of the crystals, $X_1$ for example, is tuned at a frequency $F_1$ of the band to be covered, a certain relatively large width of band pass will be obtained for the whole of the rectifying circuit, account taken of this resonance. The crystal $X_2$ not being tuned will present a greater impedance than $X_1$ to the high frequency current, and being practically short circuited, will not take part in rectifying. The high frequency energy will therefore be used for rectifying with a very good efficiency. If the tuning is displaced from that resonance frequency, two cases could appear:

(*a*) If the tuning is displaced still further from the resonance frequency of the crystal $X_2$, both crystals $X_1$ and $X_2$ feeding the same intermediate frequency circuit in parallel would present a relatively small impedance to the high frequency current; and the band width of the rectifying circuit will not decrease much.

(*b*) If the tuning comes nearer to the resonance frequency of the crystal $X_2$, the band width value will again be about the same as it was in the case of the resonance of crystal $X_1$, and the crystal $X_2$ will feed alone.

Therefore, the rectifying efficiency will thus be substantially improved, by choosing such values for the inductances $l_1$ and $l_2$ that, in the band to be covered, the tuning will be always sufficiently near to the resonance frequency of one or another crystal, so that the band width of the whole rectifier will be relatively large.

Moreover, it is worth while to point out that the total rectified energy will always be the sum of the energies rectified by each of one of the crystals. Another advantage of that arrangement is that, by a suitable choice of the inserting points A and B of both crystals on the high frequency circuit, the band width required will in a certain proportion be obtained.

With a mixer according to this principle, associated with a cylinder circuit, it has been observed that, in the frequency band of 450 to 950 megacycles, the circuit band width has not varied by more than 15 to 30 megacycles, which represents an interesting performance compared to the very great variations of band width that a single crystal had previously produced.

What I claim is:

1. In an ultra-high frequency mixer, for mixing a first signal and a second signal, and comprising an oscillating circuit tuned on said first signal, and having two distinct tapping points, said first signal having a predetermined frequency band, and a pair of crystal frequency mixers disposed in parallel; two inductance coils respectively connecting said crystals to said tapping points, the two resonant frequencies of the two series circuits respectively constituted by one of said coils and the capacitance of one of said crystals having predetermined values; said two series circuits being connected to form a series-parallel circuit, whereby the impedance of said series-parallel circuit is substantially constant in said predetermined frequency band.

2. An ultra-high frequency mixer according to claim 1, in which said oscillating circuit is of the cylinder type comprising an outer conducting hollow cylinder and an inner conducting hollow cylinder having a common axis, said two distinct tapping points being taken on said outer cylinder.

3. A device for mixing a first and a second ultra-high frequency wave comprising a tank circuit tuned on said first wave and having two tapping points; two rectifying crystals, individual inductors connecting said rectifying crystals to said tapping points; and an output intermediate frequency tuned circuit connected to said rectifying crystals.

References Cited in the file of this patent

UNITED STATES PATENTS

| | | |
|---|---|---|
| 2,296,882 | Toth | Sept. 29, 1942 |
| 2,468,237 | Sanders | Apr. 26, 1949 |
| 2,547,378 | Dicke | Apr. 3, 1951 |
| 2,578,429 | Karplus | Dec. 11, 1951 |
| 2,608,650 | Myers | Aug. 26, 1952 |
| 2,654,836 | Beck | Oct. 6, 1953 |

FOREIGN PATENTS

| | | |
|---|---|---|
| 104,815 | Australia | Aug. 25, 1938 |

OTHER REFERENCES

"Wide Range Tuned Circuits and Oscillators for High Frequencies," by Eduard Karplus; Proc. IRE, July 1945, pages 426–441.